(12) United States Patent
Harmon et al.

(10) Patent No.: US 11,240,437 B1
(45) Date of Patent: Feb. 1, 2022

(54) SYSTEMS AND METHODS FOR CONTROLLING A VEHICLE CAMERA SYSTEM

(71) Applicant: Ford Global Technologies, LLC, Dearborn, MI (US)

(72) Inventors: Michael Harmon, Westland, MI (US); David Ooms, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/074,734

(22) Filed: Oct. 20, 2020

(51) Int. Cl.
| | |
|---|---|
| *H04N 5/232* | (2006.01) |
| *H04N 5/225* | (2006.01) |
| *B60R 11/04* | (2006.01) |
| *H04N 5/247* | (2006.01) |
| *B60R 11/00* | (2006.01) |

(52) U.S. Cl.
CPC ......... *H04N 5/23299* (2018.08); *B60R 11/04* (2013.01); *H04N 5/2252* (2013.01); *H04N 5/2253* (2013.01); *H04N 5/2254* (2013.01); *H04N 5/23245* (2013.01); *H04N 5/247* (2013.01); *B60R 2011/0003* (2013.01); *B60R 2011/0005* (2013.01); *B60R 2011/0033* (2013.01)

(58) Field of Classification Search
CPC .......... H04N 5/23299; H04N 5/23293; H04N 5/23203; H04N 5/2252; H04N 7/183
See application file for complete search history.

(56) References Cited

U.S. PATENT DOCUMENTS

| | | | |
|---|---|---|---|
| 6,583,730 B2 * | 6/2003 | Lang | B60R 1/00 340/901 |
| 9,229,905 B1 * | 1/2016 | Penilla | H04L 67/306 |
| 2016/0105598 A1 | 4/2016 | Zeira et al. | |
| 2019/0274208 A1 * | 9/2019 | Zeira | H04Q 9/00 |

* cited by examiner

*Primary Examiner* — Kathleen V Nguyen
(74) *Attorney, Agent, or Firm* — Frank Lollo; Eversheds Sutherland (US) LLP

(57) ABSTRACT

The disclosure describes systems and methods for controlling a vehicle camera system. The camera system includes a computer that controls the camera system and one or more cameras that are configured to capture video inside and/or outside a vehicle.

12 Claims, 8 Drawing Sheets

SYSTEMS AND METHODS FOR CONTROLLING A VEHICLE CAMERA SYSTEM

BACKGROUND

A camera system in a vehicle provides valuable information for vehicle security and control of vehicle systems. External-facing cameras provide video of vehicles and surrounding events when driving and when parked to deter theft and establish evidence of reckless driving. Internal-facing cameras provide video that can be used to recognize individuals or objects in the vehicle, to learn the habits of drivers, to enable gesture control, or for personal use (e.g., a livestream). However, operators may have privacy concerns and want to control the use of cameras. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
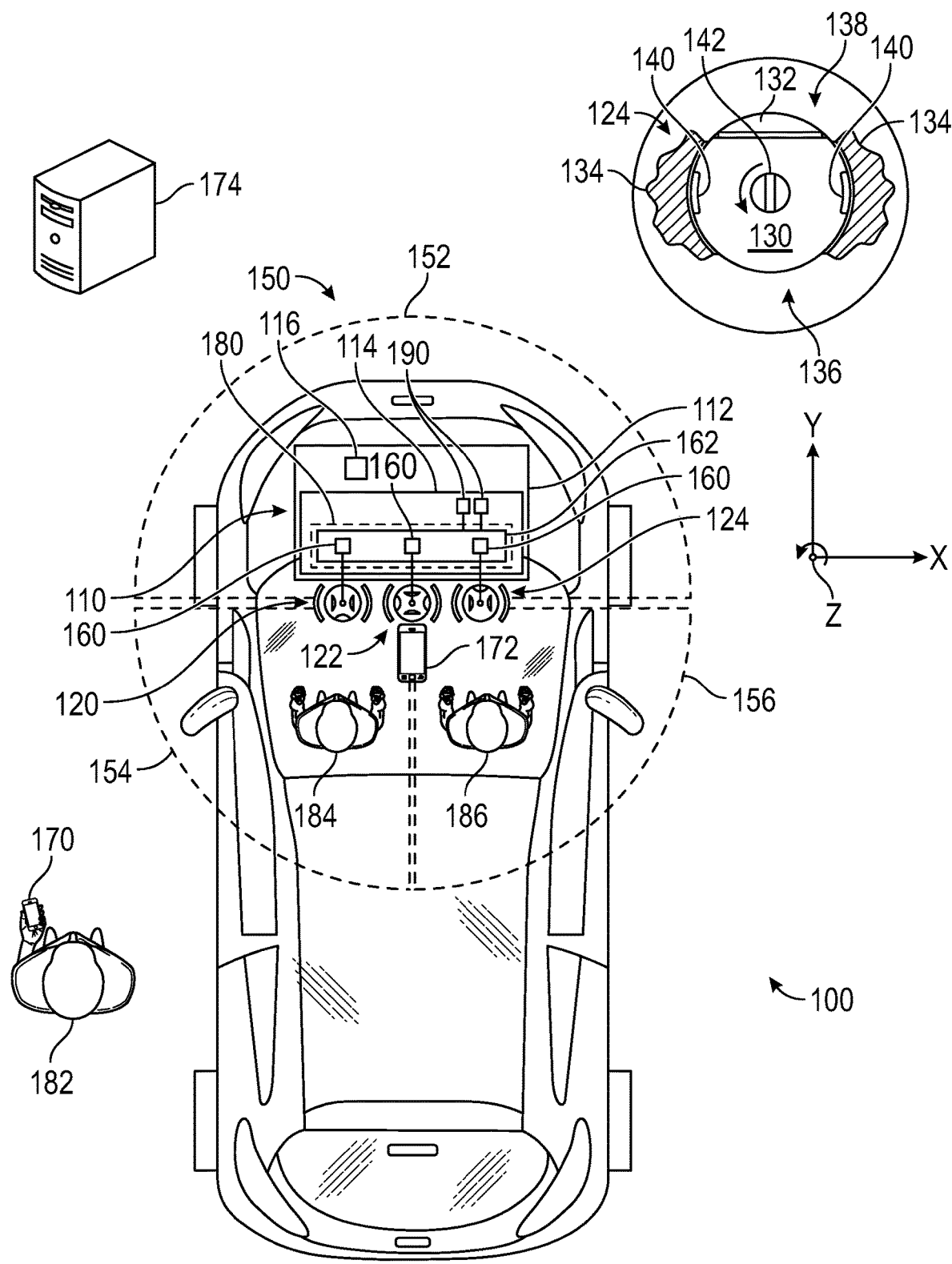
FIG. 1 depicts a vehicle with a camera system in accordance with the present disclosure.

The systems and methods disclosed herein are configured to control a vehicle camera system. Referring to FIG. 1, a vehicle 100 includes a camera system 110. The camera system 110 includes a vehicle computer 112 that controls the camera system 110 and one or more cameras 120, 122, 124 that are configured to capture video inside and/or outside the vehicle 100.

The camera 124 includes an interior housing 130 with a lens 132 and an exterior housing 134 including openings 136, 138. The camera 124 is controllable by the vehicle computer 112 to rotate (and/or translate) the interior housing 130 and/or the exterior housing 134 relative to one another and thereby fully expose the lens 132, partially-obstruct the lens 132 with the exterior housing 134, or fully obstruct the lens 132 with the exterior housing 134. The interior housing 130 (and/or the exterior housing 134) can be rotated (or translated in some examples) to at least partially obstruct a range or a coverage of the cameras 120, 122, 124 with the exterior housing 134.

The interior housing 130 or the exterior housing 134 includes a physical indicator 140 (e.g., a symbol painted on the interior housing 130) that provides an indication of when the lens 132 of the camera 124 is physically obstructed. The physical indicator 140 is exposed when the lens 132 is obstructed and is obstructed when the lens 132 is exposed. Exposure of the physical indicator 140 communicates that the lens 132 is obstructed.

In FIG. 1, an overall unobstructed range 150 of the camera system 110 includes an external range 152 and an internal range 154, 156. In general, the overall unobstructed range 150 may be reduced by at least partially obstructing a lens of at least one camera.

These and other advantages of the present disclosure are provided in greater detail herein.

Illustrative Embodiments

The disclosure will be described more fully hereinafter with reference to the accompanying drawings, in which embodiments of the disclosure are shown, and not intended to be limiting. Referring to FIG. 1, the vehicle 100 may take the form of a passenger or commercial automobile such as, for example, a car, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level 5 autonomy) or in one or more partial autonomy modes. Examples of partial autonomy modes are widely understood in the art as autonomy Levels 1 through 5.

The vehicle 100 includes the vehicle computer 112. The vehicle computer 112 may be or include an electronic vehicle controller. The vehicle computer 112 may be installed in an engine compartment of the vehicle 100 as schematically illustrated or elsewhere in the vehicle 100.

The vehicle computer 112 may operate as part of a vehicle control system described in further detail below.

The vehicle computer 112 may include a computer-readable memory 114 one or more processor(s) 116. The one or more processor(s) 116 may be disposed in communication with one or more memory devices disposed in communication with the respective computing systems (e.g., the memory 114 and/or one or more external databases). The processor(s) 116 may utilize the memory 114 to store programs in code and/or to store data for performing aspects of methods in accordance with the disclosure.

The memory 114 may be a non-transitory computer-readable memory storing program code. The memory 114 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The vehicle computer 112 may, in some example embodiments, be disposed in communication with the mobile device 170 and one or more server(s) 174.

The vehicle 100 includes the camera system 110. The camera system 110 includes the vehicle computer 112 that controls the camera system 110 and one or more cameras 120, 122, 124 that are configured to capture video inside and outside the vehicle 100. For example, internal-facing camera 120 (and cameras 122, 124 when rotated to face inward) is configured to capture video inside the vehicle 100 and external-facing camera 124 (and cameras 120, 122 when rotated to face outward) are configured to capture video outside the vehicle 100.

A detail view of the camera 124 is provided in FIG. 1 to describe the features of a camera in greater detail. The description of camera 124 is applicable to features of other cameras described herein. The vehicle 100 may include various numbers of cameras which may differ, for example, in the number of lenses or in the method of obstructing a lens of a camera.

Referring to FIG. 1, the camera 124 includes the interior housing 130. The interior housing 130 includes the lens 132. A housing can include multiple cameras or lenses. For example, camera 122 includes two lenses. The camera 124 includes exterior housing 134 including openings 136, 138.

The camera 124 is controllable by the vehicle computer 112 to rotate the interior housing 130 and/or the exterior housing 134 relative to one another and thereby fully expose the lens 132 through one of the openings 136, 138, partially-obstruct the lens 132 with the exterior housing 134, or fully obstruct the lens 132 with the exterior housing 134. In FIG. 1, the interior housing 130 rotates about a vertical axis (e.g., the z-axis extending out of the page). Alternatively, the exterior housing 134 can rotate about the z-axis.

In FIG. 1, the camera 124 has a single lens 132 and has exterior housing 134 with an interior-facing opening 136 and an exterior-facing opening 138. Here, the camera 124 is configured to be directed into or out of the vehicle 100. In the example of camera 122, which has two lenses 132 and exterior housing 134 with an interior-facing opening 136 and an exterior-facing opening 138, the camera 122 is configured to be directed both into and out of the vehicle 100. Multiple interior-facing lenses 132 can be used, for example, for stereoscopic recording enabling depth of field.

The interior housing 130 can be rotated to at least partially obstruct a range of each of the cameras 120, 122, 124 with the exterior housing 134. In FIG. 1, ninety degree rotations of the interior housing 130 (e.g., that align the lens 132 with the x-axis or y-axis) either fully expose the lenses 132 of the cameras 120, 122, 124 (e.g., aligned with the y-axis) or fully obstruct the lenses 132 of the cameras 120, 122, 124 (e.g., aligned with the x-axis) with the respective exterior housing 134.

Alternatively, ninety degree rotations of the exterior housing 134 that align the openings 136, 138 with the x-axis or y-axis either fully expose the lenses 132 of the cameras 120, 122, 124 (e.g., aligned with the y-axis) or fully obstruct the lenses 132 of the cameras 120, 122, 124 (e.g., aligned with the x-axis) with the respective exterior housing 134.

As shown, the camera 120 is rotated to be directed into the vehicle 100 and the camera 124 is rotated be directed out of the vehicle 100. The cameras 120, 122 can rotate one hundred and eighty degrees to be directed into or out of the vehicle 100 (i.e., align with either of openings 136, 138). The camera 122 is rotated such that the lenses 132 are obstructed and can rotate ninety degrees such that the lenses 132 are directed into and out of the vehicle 100.

The cameras 120, 122, 124 may also be rotated (e.g., by forty five degrees) to partially obstruct the lenses 132 of the cameras 120, 122, 124 with the exterior housing 134. For example, if a lens 132 of a camera 120, 122, 124 has an unobstructed horizontal range of one hundred eighty degrees (e.g., when aligned with an opening), the camera 120, 122, 124 may be rotated to partially obstruct the lens 132 with the exterior housing 134 to achieve a reduced horizontal range (e.g., that is less than the unobstructed horizontal range). For example, a rotation by forty five degrees may result in a reduced horizontal range of ninety degrees (e.g., as represented by ranges 154, 156 described below).

The interior housing 130 includes a physical indicator 140 (e.g., a symbol painted or printed on the interior housing 130) that provides an indication of when the lens 132 of the camera 124 is physically obstructed. For example, a part of the interior housing 130 that is exposed or partially exposed through the interior-facing opening 136 when the lens 132 is obstructed or partially-obstructed includes the physical indicator 140. In FIG. 1, the physical indicators 140 are positioned at ninety degrees with respect to the position of the lens 132.

The physical indicator 140 is exposed when the lens 132 is obstructed and is obstructed when the lens 132 is exposed. Exposure of the physical indicator 140 communicates that the lens 132 is obstructed. The dimensions of the opening 136, the physical indicator 140, and the lens 132 may be selected such that the amount of obstruction by the lens 132 corresponds to the amount of exposure of the physical indicator 140. For example, a length of the physical indicator 140 may be the same as a diameter of the lens 132.

In some examples where the exterior housing 134 rotates with respect to the interior housing 130, the exterior housing 134 includes a physical indicator 140 (e.g., a symbol painted or printed on the exterior housing 134) that provides an indication of when the lens 132 of the camera 124 is physically obstructed. For example, a part of the exterior housing 134 that faces into the vehicle 100 (e.g., in between the openings 136, 138) when the lens 132 is obstructed or partially-obstructed includes the physical indicator 140. The physical indicators 140 may be positioned at ninety degrees with respect to the openings 136, 138.

The interior housing 130 may be rotated with an axle 142 as described in further detail below with respect to the example of FIGS. 2-3.

In FIG. 1, an overall unobstructed range 150 of the camera system 110 includes an external range 152 and an internal range 154, 156. The overall unobstructed range 150 represents the combined unobstructed range of the cameras 120, 124 (e.g., three hundred sixty degrees). In general, the overall unobstructed range 150 may be reduced by at least partially obstructing a lens of at least one camera.

In the example of FIG. 1, the overall unobstructed range 150 may be reduced by at least partially obstructing a lens 132 of at least one of the cameras 120, 124. For example, the lens 132 of camera 124 may be fully obstructed to remove external range 152. The lens 132 of camera 120 can be partially obstructed to remove one of internal ranges 154, 156 or can be fully obstructed to remove both of internal ranges 154, 156.

The range of the camera system 110 may be manually set, for example, by manually controlling camera settings 160 of each camera 120, 122, 124 individually via a control input device (e.g., a mobile device 170 or center stack display 172 that communicates with the camera system 110 via the vehicle computer 112 as described below). The settings 160 can include the rotational angles of the interior housing 130 and/or the exterior housing 134 and the resulting range (e.g., a zone) which may be an unobstructed, reduced or partially-obstructed, or fully obstructed range of the camera 120, 122, 124.

The range of the camera system 110 may be automatically set by selecting a mode 162. The mode 162 includes a set of stored camera settings 160 for each camera 120, 122, 124. Different combinations of camera settings 160 for the cameras 120, 122, 124 may be created as different modes 162. For example, modes 162 may include an all-on mode 162 that provides full range 150 (e.g., for an influencer livestream), an all-off mode 162 that provides no coverage (e.g., for privacy), an external mode 162 that provides external range 152 (e.g., for vehicle safety), an internal mode 162 that provides internal range 154, 156 (e.g., for gesture control), and zone-based modes that provide partial internal ranges 154, 156 (e.g., for individuals with different preferences).

The modes 162 may be selected with the control input device 170, 172 or may be stored in a profile 180 of an individual 182, 184, 186 and automatically implemented. Some individuals 182, 184, 186 may select in their profile 180 an all-on mode 162 or internal mode 162 to record everything while in the vehicle 100 (e.g., influencers who want to livestream or use gesture controls). Other individuals 182, 184, 186 will not want to be recorded at all (e.g., for privacy) but will select in their profile 180 an external mode 162 to record when away from the vehicle 100 for the security of the vehicle 100.

The profile 180 may be created and stored by an individual 182, 184, 186, for example, on the vehicle computer 112 (e.g., via the center stack display 172) the mobile device 170, or a network server 174. For example, the vehicle 100 determines that an individual 184, 186 is in the vehicle 100, accesses the profile 180 for the individual 184, 186, and implements camera settings 160 based on a mode 162 selected in the profile 180.

The modes 162 may be implemented based on satisfying certain conditions 190. The conditions 190 may include a location of the individual 182, 184, 186, a location of the vehicle 100, a schedule or calendar of an individual 182, 184, 186, a time period, a time of day, a triggering event, enabled features of the vehicle 100, individuals 184, 186 in the vehicle 100 and their independent settings 160, combinations thereof, and the like. Data that indicates the condition 190 may be received from the vehicle computer 112, the mobile device 170, and the profile 180. For example, the vehicle computer 112 may gather data from vehicle sensors.

The time of day or time period or event may include a work commute or a road trip. The location of the individual and the location of the vehicle may be used to indicate when and where the individual is in the vehicle, and when the individual is away from the vehicle. The features of the vehicle may include video-enabled features such as gesture controls.

For example, a first mode 162 can be set to for a work commute and a second mode 162 can be set for a road trip. A first mode 162 can be set when the individual is away from the vehicle 100 and a second mode 162 can be set when the individual is in the vehicle.

If the vehicle 100 determines that multiple individuals 184, 186 are in the vehicle 100, the vehicle 100 may promote the profile 180 of one individual 184 (e.g., the driver) over the other individuals 186. Alternatively, the vehicle 100 may combine the preferences (e.g., mode 162) of each individual 184, 186. For example, methods for partially obstructing the cameras 120 can be used to reduce the camera range 154, 156 inside the vehicle 100. The individual 184 in range 154 (e.g., driver's seat) may prefer to have the camera 120 on for gesture control and the individual 186 in range 156 may prefer to have the camera 120 off for privacy. The camera system 110 combines the preferences in the profiles 180 to determine camera settings 160 that provide camera range that best fits the preferences of the group of individuals. Here, the camera 120 is rotated to partially obstruct the lens 132 of the camera 120 and thereby reduce the range of the camera to range 154, removing range 156.

In addition to the detail view of the camera 124 that is provided in FIG. 1, FIGS. 2-6 illustrate additional examples of cameras.

Figure 2:
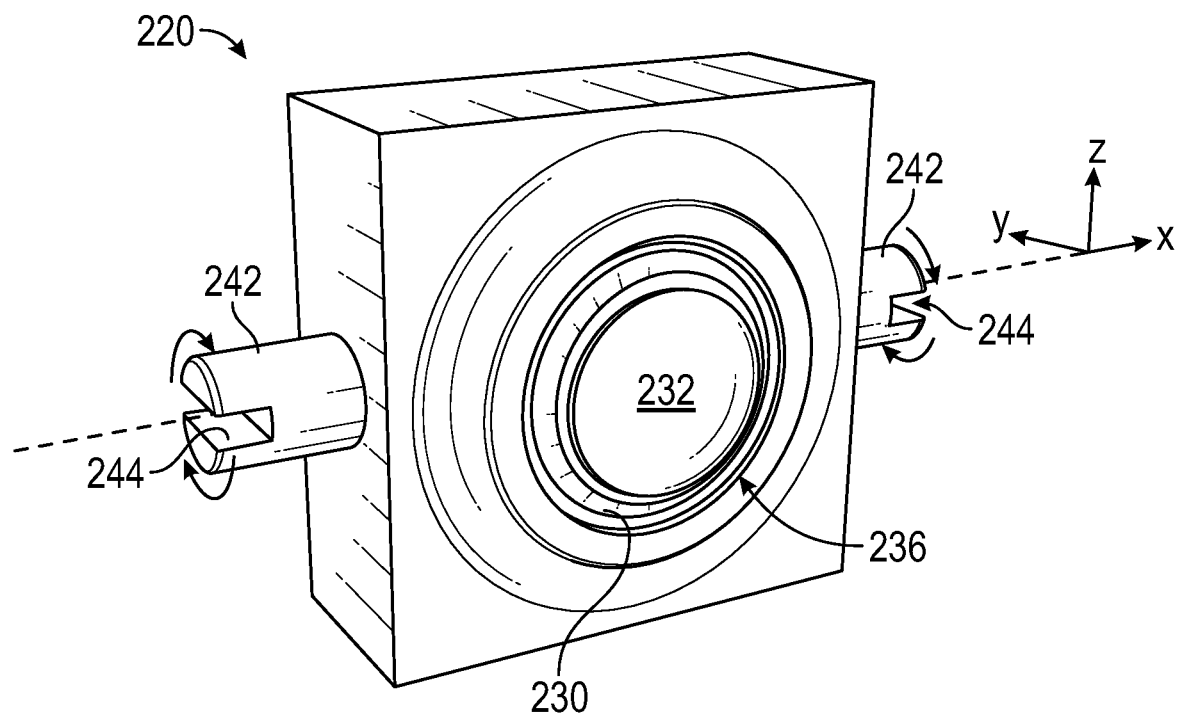
FIGS. 2-3 depict various positions of a camera of a camera system in accordance with the present disclosure.
Figure 3:
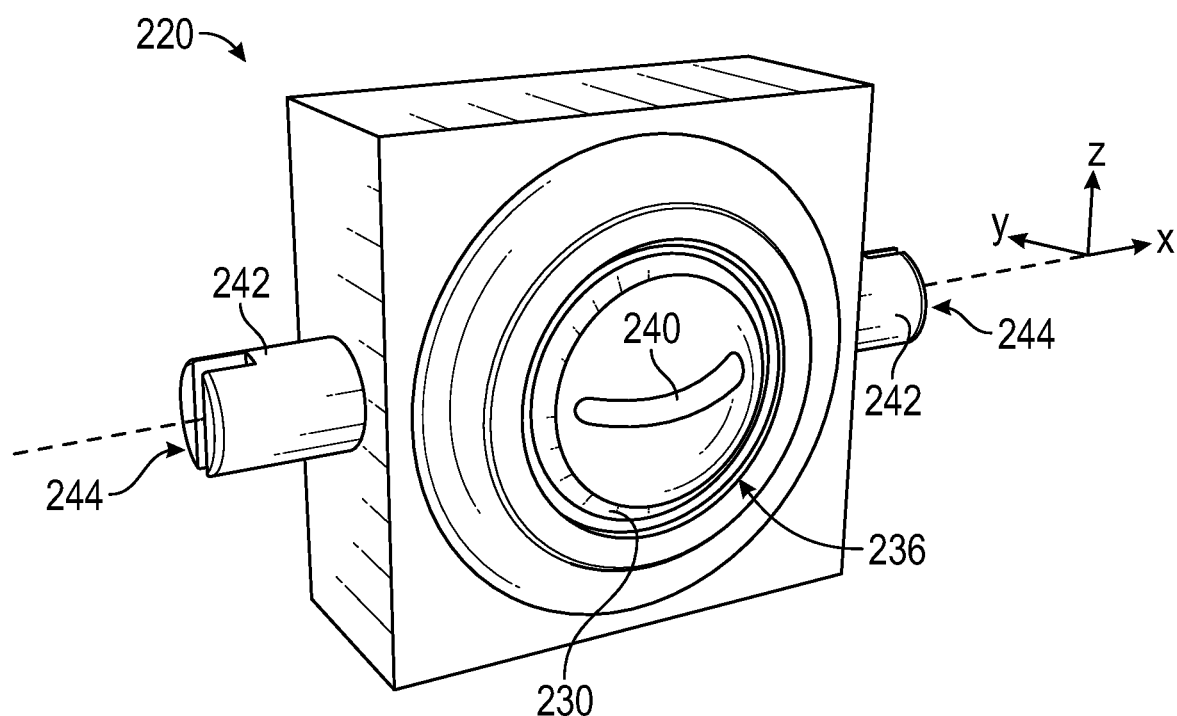

FIGS. 2-3 illustrate a camera 220 that includes interior housing 230 including a lens 232, and exterior housing 234 including an opening 236. The camera 220 is controllable by the vehicle computer 112 to rotate the interior housing 230 and/or the exterior housing 234 relative to one another and thereby fully expose the lens 232 through the opening 236, partially-obstruct the lens 232 with the exterior housing 234, or fully obstruct the lens 232 with the exterior housing 234. In FIGS. 2-3, the interior housing 230 rotates about a horizontal axis (e.g., the x-axis). Alternatively, the exterior housing 234 can rotate about the x-axis.

The interior housing 230 includes a physical indicator 240 (e.g., a symbol painted or printed on the interior housing 230) that provides an indication of when the lens 232 of the camera 220 is physically obstructed. For example, a part of the interior housing 230 that is exposed or partially exposed through the interior-facing opening 236 when the lens 232 is obstructed or partially-obstructed includes the physical indicator 240. The physical indicator 240 is exposed when the lens 232 is obstructed and is obstructed when the lens 232 is exposed. Exposure of the physical indicator 240 communicates that the lens 232 is obstructed.

The interior housing 230 may include or be attached to an axle 242 that is configured to be rotated to rotate the interior housing 230. The axle 242 includes slotted ends 244 that can be engaged (e.g., by a motor) to rotate the axle 242. FIG. 2 illustrates a first position where the slotted end 244 is horizontal (e.g., the x-y plane) and FIG. 3 illustrates a second position (e.g., rotated ninety degrees from the first position) where the slotted end 244 is vertical (e.g., the x-z plane). In the first position, the lens 232 is exposed. In the second position, the lens 232 is obstructed and the physical indicator 240 is exposed.

Figure 5:
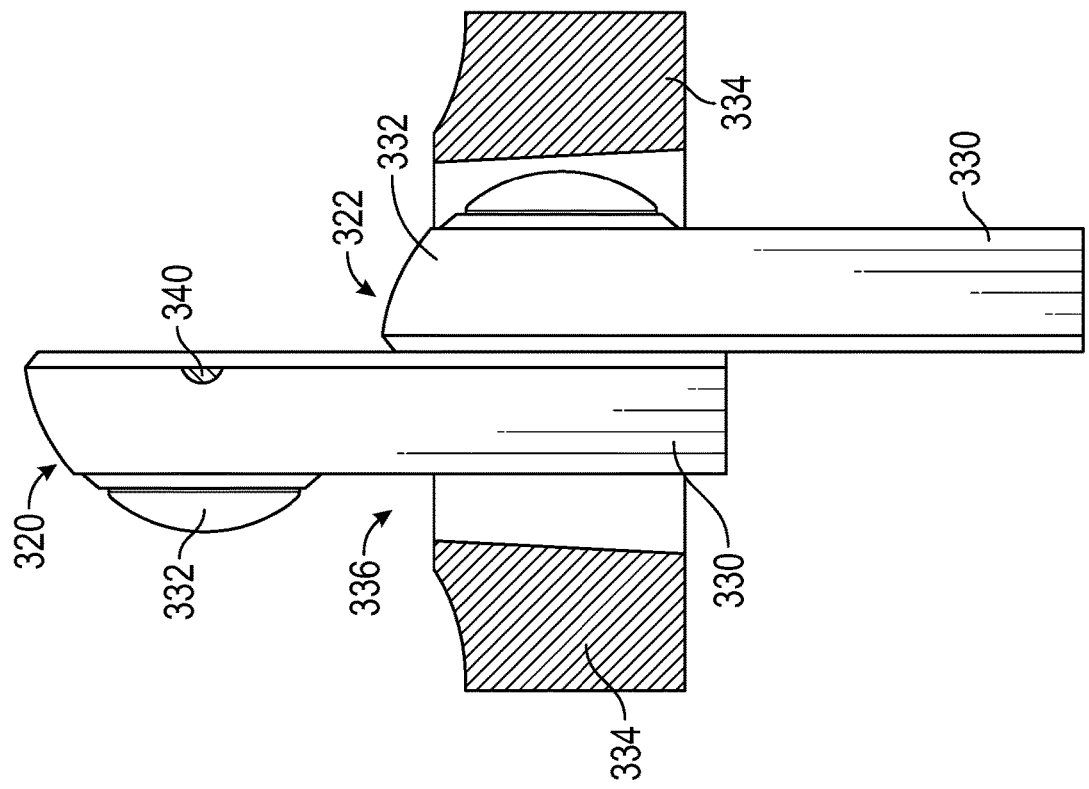
FIGS. 4-6 depict various positions a camera of a camera system in accordance with the present disclosure.
Figure 4:
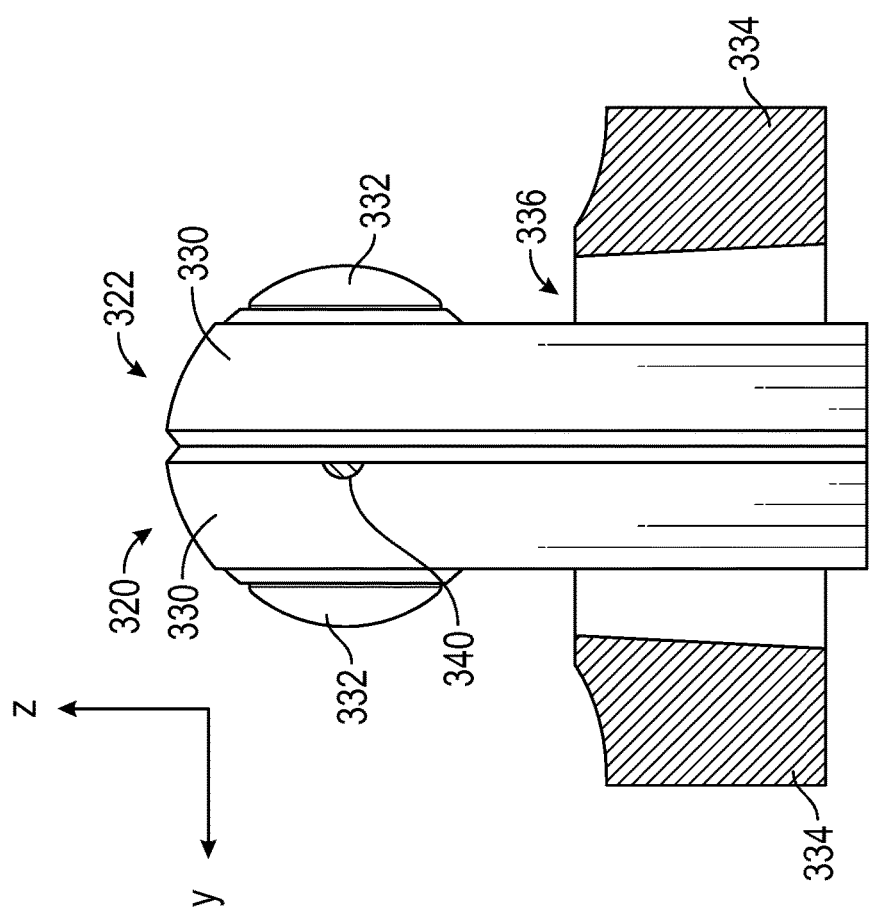
Figure 6:
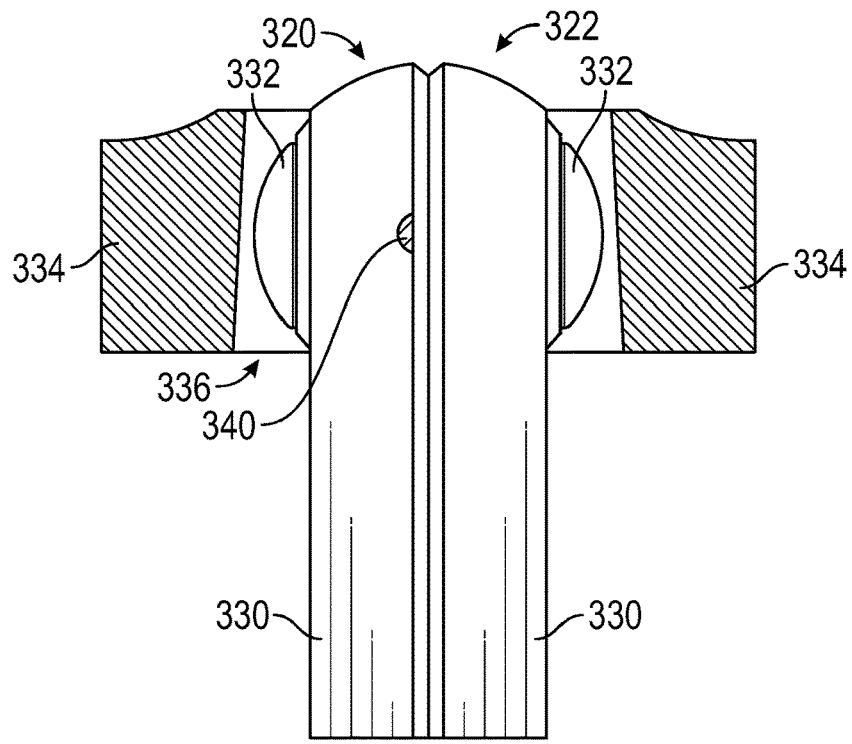

FIGS. 4-6 illustrate cameras 320, 322 that include an interior housing 330 including a lens 332, and an exterior housing 334 including an opening 336. The cameras 320, 322 are controllable by the vehicle computer 112 to translate (e.g., extend and retract) the interior housing 330 and/or the exterior housing 334 relative to one another and thereby fully expose the lens 332 through the opening 336, partially-obstruct the lens 332 with the exterior housing 334, or fully obstruct the lens 332 with the exterior housing 334. In FIGS. 4-6, the interior housing 330 translates along a vertical axis (e.g., the z-axis). In other examples, the exterior housing 334 can translate along the z-axis.

In this example, camera 320 is an outward-facing camera and camera 322 is an inward-facing camera. In other examples, a single camera or multiple cameras may be used and the cameras can be directed in various directions.

In FIG. 4, the cameras 320, 322 are extended to fully expose the lenses 332. In FIG. 5, camera 320 is extended to fully expose the outward-facing lens 332 and camera 320 is retracted to obstruct the inward-facing lens 332. In FIG. 6, the cameras 320, 322 are retracted to obstruct the lenses 332.

The interior housing 330 of camera 320 includes a physical indicator 340 (e.g., a symbol painted or printed on the interior housing 330) that provides an indication of when the lens 332 of the camera 322 is physically obstructed. For example, referring to FIG. 5, the interior housing 330 of the camera 320 that is exposed when the camera 322 is retracted includes the physical indicator 340. In other examples, a divider between the cameras 320, 322 can include the physical indicator 340 such that when the camera 322 is retracted the physical indicator 340 is exposed.

In still other examples, at least part of the exterior housing 334 may extend to obstruct the camera 320 and may include an inward-facing (e.g., to the interior of the vehicle) surface that includes the physical indicator 340.

Figure 7:
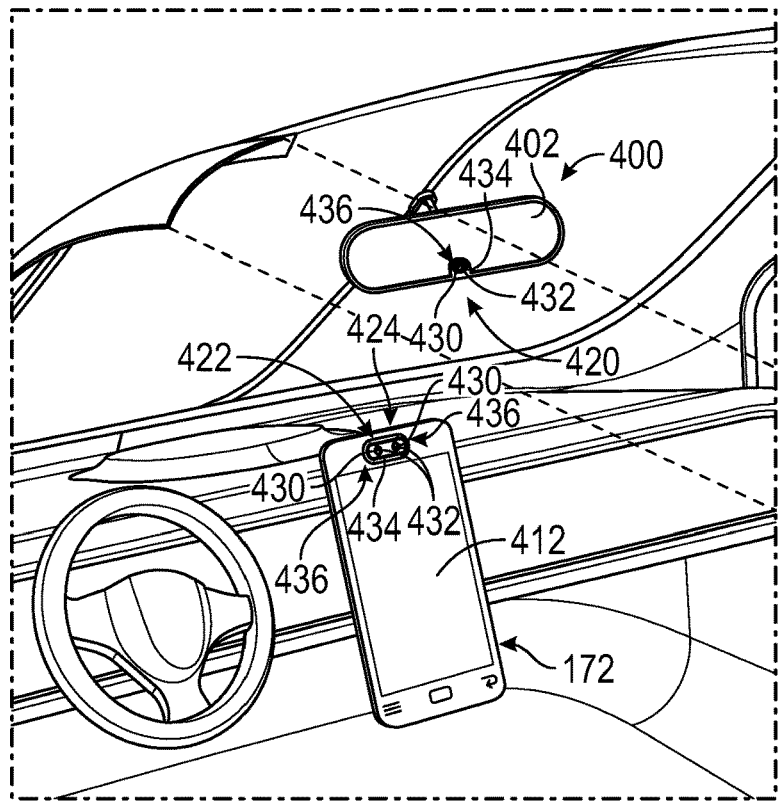
FIG. 7 depicts a camera system in a vehicle in accordance with the present disclosure.
Figure 8:
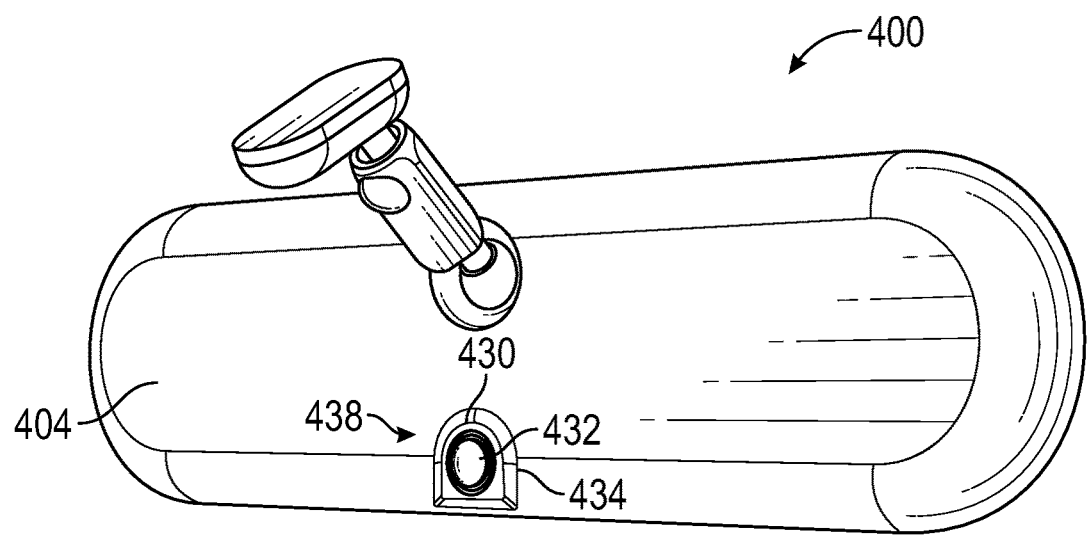
FIGS. 8-9 depict a review mirror including cameras of the camera system of FIG. 7 in accordance with the present disclosure.
Figure 9:
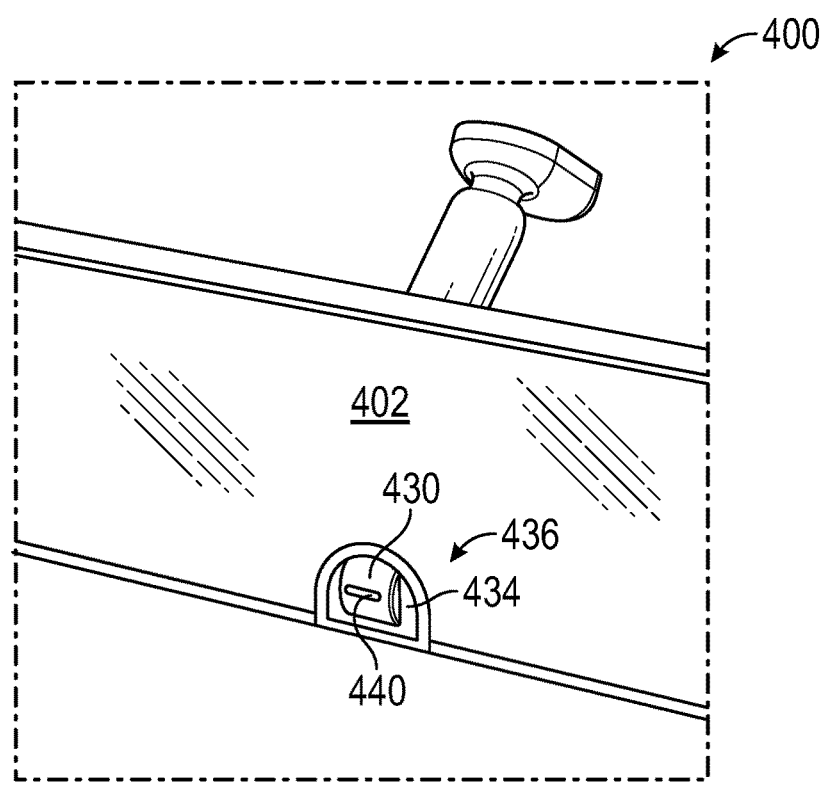

Referring to FIGS. 7-9, the vehicle 100 includes cameras 420, 422, 424 each of which are generally configured as described with respect to camera 220. The cameras 420, 422, 424 respectively include interior housing 430. Each interior housing 430 includes a lens 432 and a physical indicator 440. Each external housing 434 includes openings 436, 438.

A rearview mirror 400 of the vehicle 100 includes the camera 420. In this example, the rearview mirror 400 provides or includes the external housing 434 of the camera 420. The rearview mirror 400 includes a front side 402 (e.g., a mirror side or interior-facing side) and a backside 404 (or exterior-facing side). The front side 402 includes the interior-facing opening 436 and the backside 404 includes the exterior-facing opening 438.

Camera 420 has two lenses 432. As shown in FIG. 7, a first lens 432 of camera 420 is directed into the vehicle 100 and is fully exposed through the interior-facing opening 436. As shown in FIG. 8, a second lens 432 of cameras 420 is directed out of the vehicle 100 and fully exposed through the exterior-facing opening 438. As shown in FIG. 9, the camera 420 is rotated (e.g., lenses 432 directed up and down) such that the lenses 432 are obstructed and the physical indicator 440 is exposed through the interior-facing opening 436. Alternatively, FIGS. 7 and 8 may represent camera 420 with a single lens 432 in two different positions where the lens 432 may be aligned with respective openings 436, 438.

Figure 10:
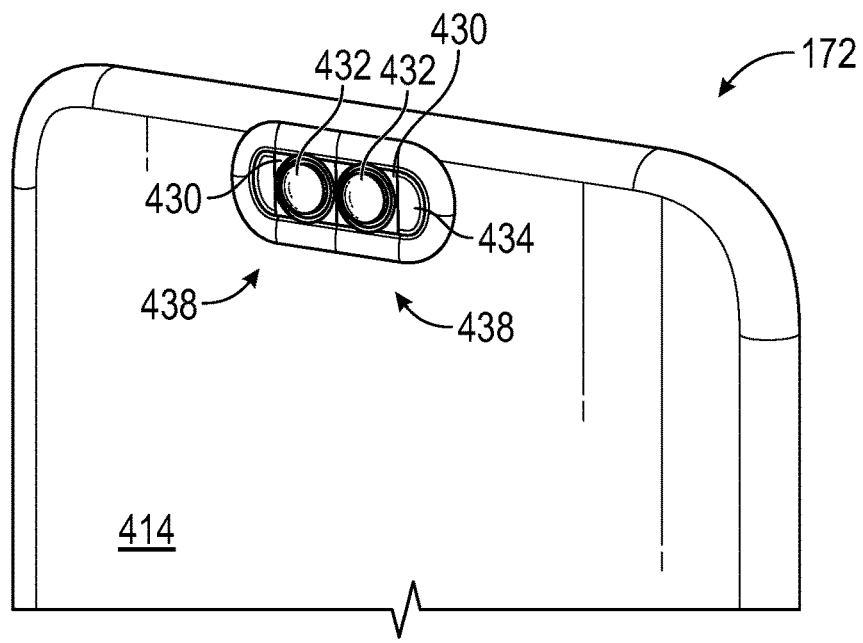
FIGS. 10-11 depict a center stack display including cameras of the camera system of FIG. 7 in accordance with the present disclosure.
Figure 11:
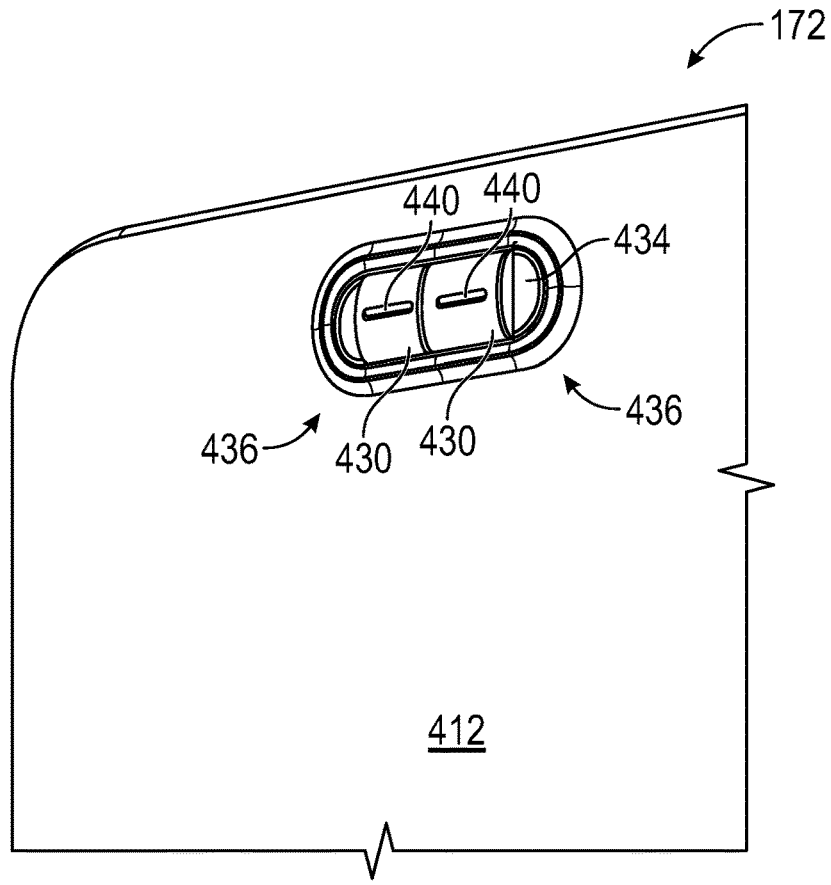

Referring to FIGS. 7 and 10-11, the center stack display 172 of the vehicle 100 includes the cameras 422, 424. The center stack display 172 provides or includes the external housing 434 of the cameras 422, 424. The center stack display 172 includes a front side 412 (e.g., a display side or interior-facing side) and a back side 414 (or exterior-facing side). In this example, the front side 412 includes interior-facing openings 436 and the back side 414 includes exterior-facing openings 438.

As shown in FIG. 7, the cameras 422, 424 are rotated such that the lenses 432 are directed into the vehicle 100. Here, the lenses 432 are fully exposed through the interior-facing openings 436. As shown in FIG. 10, the cameras 422, 424 are rotated such that the lenses 432 are directed out of the vehicle 100. Here, the lenses 432 are fully exposed through the exterior-facing openings 438. As shown in FIG. 11, the cameras 420, 422 are rotated (e.g., lenses 432 directed up or down) such that the lenses 432 are obstructed and the physical indicators 440 are exposed.

Figure 12:
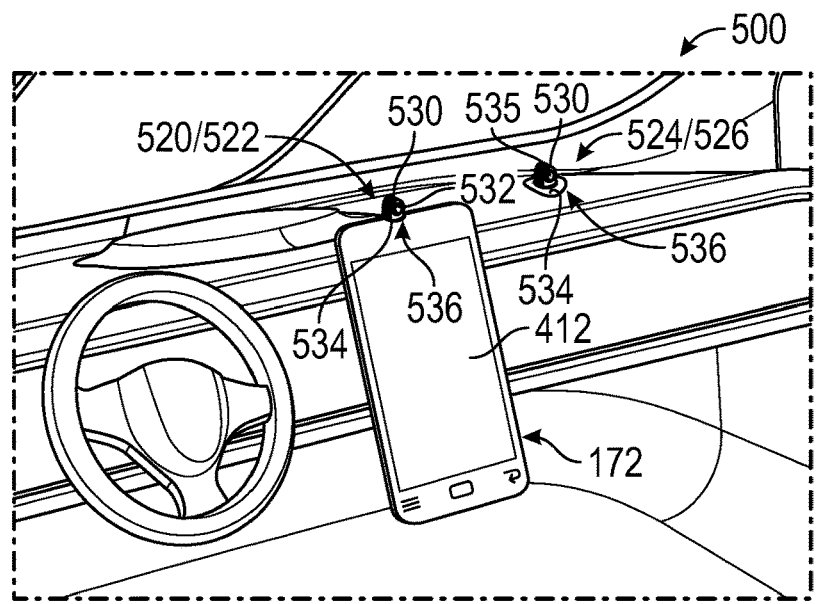
FIG. 12 depicts a camera system in a vehicle in accordance with the present disclosure.
Figure 13:
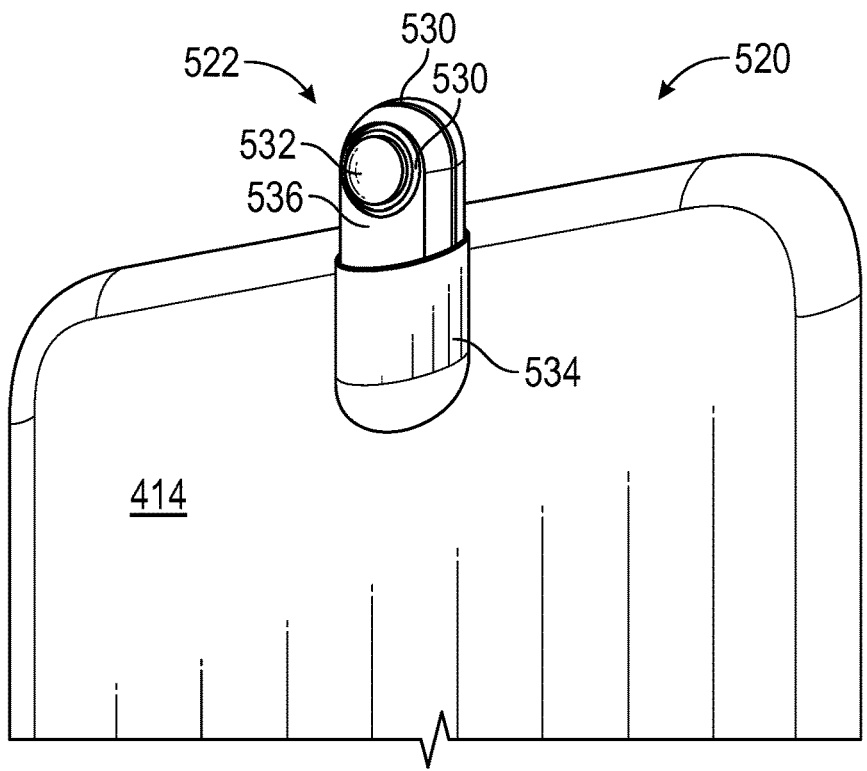
FIG. 13 depicts a center stack display including camera of the camera system of FIG. 12 in accordance with the present disclosure.

Referring to FIGS. 12-13, the center stack display 172 of the vehicle 100 includes cameras 520, 522 and a dash 500 includes cameras 524, 526. The cameras 520, 522 and the cameras 524, 526 are generally configured as described with respect to cameras 320, 322. The cameras 520, 522, 524, 526 include interior housing 530. The interior housing 530 includes a lens 532 and a physical indicator 540. The external housing 534 includes an opening 536. The center stack display 172 provides or includes the external housing 534 of the cameras 520, 522 and the dash 500 provides or includes the external housing 534 of the cameras 524, 526.

As shown in FIG. 12, the cameras 520, 522 and cameras 524, 526 are extended such that the lenses 532 are directed into and out of the vehicle 100. As shown in FIG. 13, the camera 522 is extended such that the lens 532 is directed out of the vehicle 100.

Figure 14:
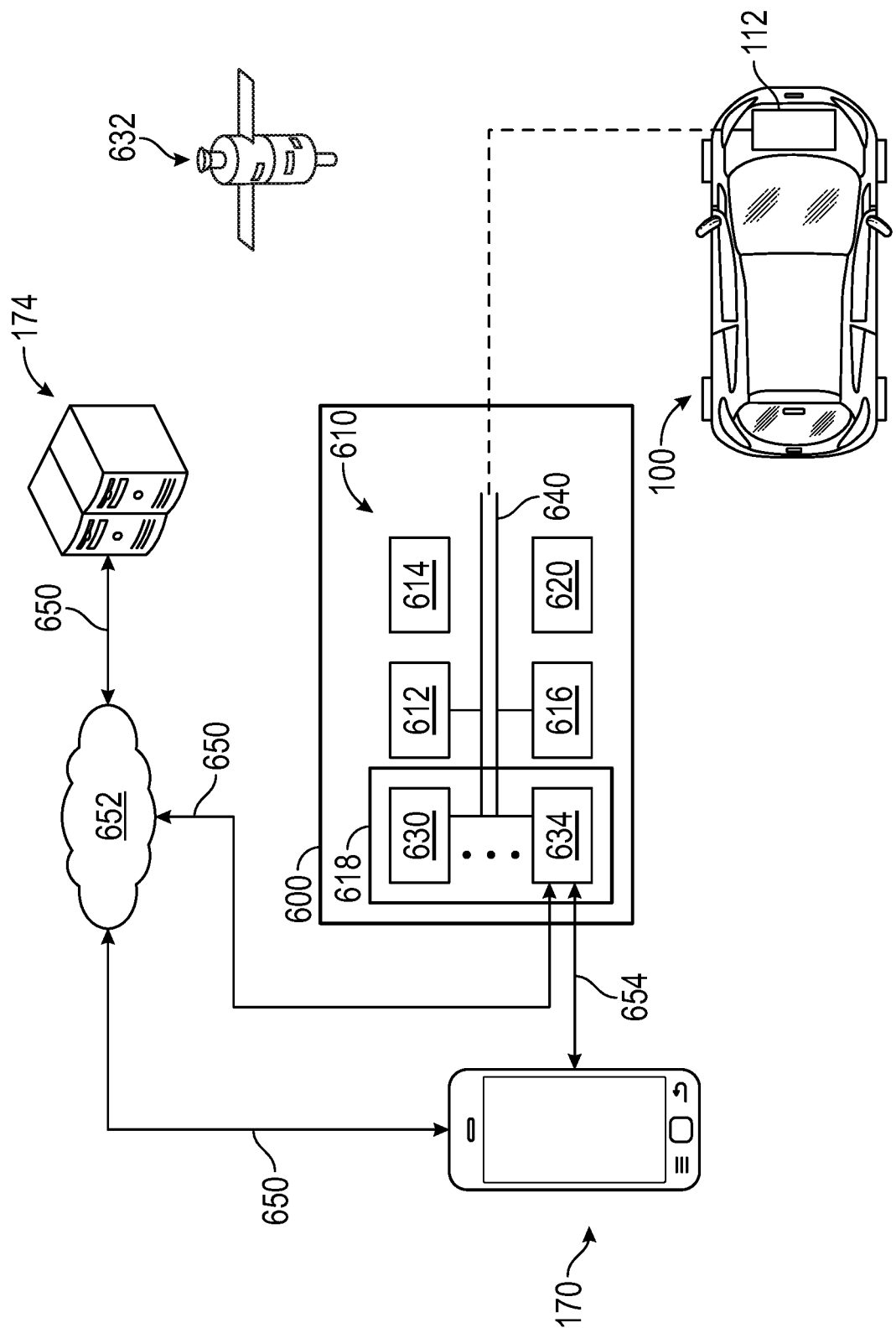
FIG. 14 depicts a vehicle and an example functional schematic of a vehicle control system in accordance with the present disclosure.

Referring to FIG. 14, vehicle systems are described in greater detail. The vehicle 100 includes a Vehicle Controls Unit (VCU) 600. The VCU 600 includes a plurality of electronic control units (ECUs) 610 disposed in communication with the vehicle computer 112.

The VCU 600 may coordinate the data between vehicle systems, connected servers (e.g., the server(s) 174), and other vehicles operating as part of a vehicle fleet. The server(s) 174 may be part of a cloud-based computing infrastructure, and may be associated with and/or include a Telematics Service Delivery Network (SDN) that provides digital data services to the vehicle 100 and other vehicles that may be part of a vehicle fleet.

The VCU 600 can include or communicate with any combination of the ECUs 610, such as, for example, a Body Control Module (BCM) 612, an Engine Control Module (ECM) 614, a Transmission Control Module (TCM) 616, a Telematics Control Unit (TCU) 618, a Restraint Control Module (RCM) 620, and the like.

The VCU 600 may control aspects of the vehicle 100, and implement one or more instruction sets received from an application operating on the mobile device 170, and/or from instructions received from a vehicle system controller.

The TCU 618 can be configured to provide vehicle connectivity to wireless computing systems onboard and offboard the vehicle 100 and is configurable for wireless communication between the vehicle 100 and other systems, computers, and modules. For example, the TCU 618 includes a Navigation (NAV) system 630 for receiving and processing a GPS signal from a GPS 632, a Bluetooth® Low-Energy Module (BLEM) 634, a Wi-Fi transceiver, an Ultra-Wide Band (UWB) transceiver, and/or other wireless transceivers.

The NAV system 630 may be configured and/or programmed to determine a position of the vehicle 100. The NAV system 630 may include a Global Positioning System (GPS) receiver configured or programmed to triangulate the position of the vehicle 100 relative to satellites or terrestrial based transmitter towers associated with the GPS 632. The NAV system 630, therefore, may be configured or programmed for wireless communication.

The NAV system 630 may be further configured or programmed to develop routes from a current location to a selected destination, as well as display a map and present driving directions to the selected destination via, e.g., the center stack display 172. In some instances, the NAV system 630 may develop the route according to a user preference. Examples of user preferences may include maximizing fuel efficiency, reducing travel time, travelling the shortest distance, or the like.

The TCU 618 generally includes wireless transmission and communication hardware that may be disposed in communication with one or more transceivers associated with telecommunications towers and other wireless telecommunications infrastructure. For example, the BLEM 634 may be configured and/or programmed to receive messages from, and transmit messages to, one or more cellular towers associated with a telecommunication provider, and/or and a Telematics Service Delivery Network (SDN) associated with the vehicle 100 for coordinating vehicle fleet.

The TCU 618 may be disposed in communication with the ECUs 610 by way of a Controller Area Network (CAN) bus 640. In some aspects, the TCU 618 may retrieve data and send data as a CAN bus 640 node.

The BLEM 634 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 634 may include Generic Attribute Profile (GATT) device connectivity for client devices that respond to or initiate GATT commands and requests, and connect directly with the mobile device 170.

The CAN bus 640 may be configured as a multi-master serial bus standard for connecting two or more of the ECUs 610 as nodes using a message-based protocol that can be configured and/or programmed to allow the ECUs 610 to communicate with each other. The CAN bus 640 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 610 may communicate with a host computer (e.g., the vehicle computer 112, the mobile device 170, and/or the server(s) 174, etc.), and may also communicate with one another without the necessity of a host computer.

The CAN bus 640 may connect the ECUs 610 with the vehicle computer 112 such that the vehicle computer 112 may retrieve information from, send information to, and otherwise interact with the ECUs 610 to perform steps described according to embodiments of the present disclosure. The CAN bus 640 may connect CAN bus nodes (e.g., the ECUs 610) to each other through a two-wire bus, which may be a twisted pair having a nominal characteristic impedance. The CAN bus 640 may also be accomplished using other communication protocol solutions, such as Media Oriented Systems Transport (MOST) or Ethernet. In other aspects, the CAN bus 640 may be a wireless intra-vehicle CAN bus.

The VCU 600 may control various loads directly via the CAN bus 640 communication or implement such control in conjunction with the BCM 612. The ECUs 610 described with respect to the VCU 600 are provided for exemplary purposes only, and are not intended to be limiting or exclusive. Control and/or communication with other control modules is possible, and such control is contemplated.

The ECUs 610 may control aspects of vehicle operation and communication using inputs from human drivers, inputs from a vehicle system controller, the vehicle control system, and/or via wireless signal inputs received via wireless channel(s) 650 from other connected devices such as the mobile device 170, among others. The ECUs 610, when configured as nodes in the CAN bus 640, may each include a central processing unit (CPU), a CAN controller, and/or a transceiver. For example, although the mobile device 170 is depicted in FIG. 14 as connecting to the vehicle 100 via the BLEM 634, it is contemplated that the wireless connection may also or alternatively be established between the mobile device 170 and one or more of the ECUs 610 via the respective transceiver(s) associated with the module(s).

The BCM 612 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 612 may also operate as a gateway for bus and network interfaces to interact with remote ECUs.

The BCM 612 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 612 may be configured for vehicle energy management, exterior lighting control, wiper functionality, power window and door functionality, heating ventilation and air conditioning systems, and driver integration systems. In other aspects, the BCM 612 may control auxiliary equipment functionality, and/or is responsible for integration of such functionality. In one aspect, a vehicle having a vehicle control system may integrate the system using, at least in part, the BCM 612.

The mobile device 170 may connect with the vehicle computer 112 using wired and/or wireless communication protocols and transceivers. The mobile device 170 may be communicatively coupled with the vehicle 100 via one or more network(s) 652, which may communicate via one or more wireless channel(s) 650, and/or may connect with the vehicle 100 directly using near field communication (NFC) protocols, Bluetooth® protocols, Wi-Fi, Ultra-Wide Band (UWB), and other possible data connection and sharing techniques. The vehicle 100 may also receive and/or be in communication with the Global Positioning System (GPS) 632.

In some aspects, the mobile device 170 may communicate with the vehicle 100 through the one or more wireless channel(s) 650, which may be encrypted and established between the mobile device 170 and the Telematics Control Unit (TCU) 618. The mobile device 170 may communicate with the TCU 618 using a wireless transmitter associated with the TCU 618 on the vehicle 100. The transmitter may communicate with the mobile device 170 using a wireless communication network such as, for example, the one or more network(s) 652. The wireless channel(s) 650 are depicted in FIG. 14 as communicating via the one or more network(s) 652, and also via direct communication (e.g., channel 654) with the vehicle 100.

The network(s) 652 illustrate an example of an example communication infrastructure in which the connected devices discussed in various embodiments of this disclosure may communicate. The network(s) 652 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
 a camera, comprising:
  a first interior housing comprising a first lens;
  a second interior housing comprising a second lens, wherein the first lens faces an interior portion of a vehicle and the second lens faces an exterior portion of the vehicle;
  an exterior housing comprising both the first interior housing and the second interior housing, and further comprising a first opening and a second opening, wherein the camera is configured to move the first interior housing, the second interior housing, and the exterior housing relative to one another such that:
   in a first position, the first lens is unobstructed by the exterior housing and the second lens is obstructed by the exterior housing; and
   in a second position, the first lens is obstructed by the exterior housing and the second lens is unobstructed by the exterior housing; and
  a physical indicator on at least one of the second interior housing and the exterior housing, wherein the physical indicator is hidden in the first position and exposed in the second position.

2. The vehicle of claim 1, wherein the first lens is aligned with the first opening in the first position.

3. The vehicle of claim 1, wherein the camera comprises at least two cameras configured to translate through the first opening or the second opening.

4. The vehicle of claim 3, wherein an interior housing of an exterior-facing camera of the at least two cameras includes the physical indicator.

5. The vehicle of claim 1, wherein at least one of a rearview mirror, a center stack display, and a dash includes or provides the exterior housing.

6. The vehicle of claim 1, wherein a computer is configured to control the camera based on at least one setting for the camera.

7. The vehicle of claim 1, wherein the camera includes a plurality of cameras and a computer is configured to control the plurality of cameras based on a mode, the mode comprising a plurality of settings corresponding to the plurality of cameras.

8. The vehicle of claim 7, wherein the mode is selected in a profile of an individual and the vehicle is configured to access the mode in the profile.

9. The vehicle of claim 7, wherein the computer is configured to control the plurality of cameras based on the mode to at least one of remove an interior range and remove an exterior range of the cameras.

10. The vehicle of claim 1, wherein the camera is configured to be controlled by a computer to move the first interior housing and the exterior housing relative to one another such that, in a third position, the first lens is partially obstructed by the exterior housing.

11. A camera, comprising:
a first interior housing comprising a first lens;
a second interior housing comprising a second lens, wherein the first lens faces an interior portion of a vehicle and the second lens faces an exterior portion of the vehicle;
an exterior housing comprising both the first interior housing and the second interior housing, and further comprising a first opening and a second opening, wherein the camera is configured to move the first interior housing, the second interior housing, and the exterior housing relative to one another such that:
in a first position, the first lens is unobstructed by the exterior housing and the second lens is obstructed by the exterior housing; and in a second position, the first lens is obstructed by the exterior housing and the second lens is unobstructed by the exterior housing; and
a physical indicator on at least one of the second interior housing and the exterior housing, wherein the physical indicator is hidden in the first position and exposed in the second position.

12. The camera of claim 11, wherein the first lens is aligned with the first opening in the first position.

* * * * *